US008843550B2

(12) United States Patent
Even et al.

(10) Patent No.: US 8,843,550 B2
(45) Date of Patent: Sep. 23, 2014

(54) SYSTEM AND METHOD FOR CONTROLLING ONE OR MORE MULTIPOINT CONTROL UNITS AS ONE MULTIPOINT CONTROL UNIT

(75) Inventors: Roni Even, Tel Aviv (IL); Sigmund Gavish, Tel Aviv (IL); Itay Yad-Shalom, Tel Aviv (IL)

(73) Assignee: Polycom Israel Ltd., Petach-Tikva (IL)

( * ) Notice: Subject to any disclaimer, the term of this patent is extended or adjusted under 35 U.S.C. 154(b) by 1771 days.

(21) Appl. No.: 11/612,182

(22) Filed: Dec. 18, 2006

(65) Prior Publication Data

US 2007/0126862 A1 Jun. 7, 2007

Related U.S. Application Data

(62) Division of application No. 09/708,898, filed on Nov. 8, 2000, now Pat. No. 7,174,365.

(60) Provisional application No. 60/164,298, filed on Nov. 8, 1999.

(51) Int. Cl.
*G06F 15/16* (2006.01)

(52) U.S. Cl.
USPC ............................................ 709/204; 709/227

(58) Field of Classification Search
USPC ................... 709/204, 201, 226, 227
See application file for complete search history.

(56) References Cited

U.S. PATENT DOCUMENTS

| 4,362,928 | A | 12/1982 | Sheldon |
| 5,318,614 | A | 6/1994 | Beguin |
| 5,473,363 | A | 12/1995 | Ng et al. |
| 5,535,373 | A | 7/1996 | Olnowich |
| 5,563,882 | A | 10/1996 | Bruno et al. |
| 5,600,646 | A | 2/1997 | Polomski |
| 5,623,312 | A | 4/1997 | Yan et al. |
| 5,680,392 | A | 10/1997 | Semaan |
| 5,684,527 | A | 11/1997 | Terui et al. |

(Continued)

FOREIGN PATENT DOCUMENTS

| CA | 2293255 A1 | 12/1999 |
| EP | 0 794 645 A2 | 10/1997 |
| EP | 0 817 484 | 1/1998 |
| KR | 1998-028673 | 7/1998 |

OTHER PUBLICATIONS

James Toga, et al.; "ITU-T Standardization Activities for Interactive Multimedia Communications on Packet-Based Networks: H.323 and Related Recommendations;" Computer Networks, vol. 31, No. 3, Feb. 11, 1999, pp. 205-223, North Holland Publishing, Amsterdam, NL.

*Primary Examiner* — Michael Y Won
(74) *Attorney, Agent, or Firm* — Wong, Cabello, Lutsch, Rutherford & Brucculeri, LLP

(57) ABSTRACT

A system for controlling multiple multipoint control units (MCUs) with a single apparatus is disclosed. The system utilizes a Virtual MCU (VMCU) to communicate with a plurality of MCUs. A user initiates a reserve conference command with the VMCU. If sufficient resources are available, the reservation is made and connection numbers are assigned. When the time for the conference arises, an MCU is assigned to the conference. The participants are then connected to the conference. By using a single VMCU to schedule and coordinate multiple MCUs, the system is able to efficiently schedule a large number of conferences. This greater efficiency in scheduling may allow users to schedule conferences without the advance notice that is usually required.

25 Claims, 7 Drawing Sheets

(56) References Cited

U.S. PATENT DOCUMENTS

| | | | |
|---|---|---|---|
| 5,689,553 A | 11/1997 | Ahuja et al. | |
| 5,694,544 A | 12/1997 | Tanigawa et al. | |
| 5,729,684 A | 3/1998 | Kuzma | |
| 5,740,161 A | 4/1998 | Porter et al. | |
| 5,742,772 A | 4/1998 | Sreenan | |
| 5,821,985 A | 10/1998 | Iizawa | |
| 5,822,301 A | 10/1998 | Arnold et al. | |
| 5,838,664 A | 11/1998 | Polomski | |
| 5,862,329 A | 1/1999 | Aras et al. | |
| 5,867,653 A | 2/1999 | Aras et al. | |
| 5,894,321 A | 4/1999 | Downs et al. | |
| 5,898,676 A | 4/1999 | Apfelbeck et al. | |
| 5,933,417 A * | 8/1999 | Rottoo | 370/260 |
| 5,938,735 A * | 8/1999 | Malik | 709/238 |
| 5,963,547 A | 10/1999 | O'Neil et al. | |
| 5,983,269 A | 11/1999 | Mattson et al. | |
| 5,995,608 A | 11/1999 | Detampel, Jr. et al. | |
| 6,006,253 A | 12/1999 | Kumar et al. | |
| 6,018,360 A | 1/2000 | Stewart et al. | |
| 6,122,665 A * | 9/2000 | Bar et al. | 709/224 |
| 6,128,509 A | 10/2000 | Veijola et al. | |
| 6,157,401 A | 12/2000 | Wiryaman | |
| 6,181,696 B1 | 1/2001 | Fielding et al. | |
| 6,212,602 B1 | 4/2001 | Wicki et al. | |
| 6,259,691 B1 * | 7/2001 | Naudus | 370/352 |
| 6,259,785 B1 | 7/2001 | Shaffer et al. | |
| 6,304,648 B1 | 10/2001 | Chang | |
| 6,380,968 B1 | 4/2002 | Alexander et al. | |
| 6,438,111 B1 | 8/2002 | Catanzaro et al. | |
| 6,457,043 B1 * | 9/2002 | Kwak et al. | 709/204 |
| 6,584,493 B1 * | 6/2003 | Butler | 709/204 |
| 6,590,604 B1 | 7/2003 | Tucker et al. | |
| 6,611,503 B1 | 8/2003 | Fitzgerald et al. | |
| 6,646,997 B1 | 11/2003 | Baxley et al. | |
| 6,683,858 B1 | 1/2004 | Chu et al. | |
| 6,728,358 B2 | 4/2004 | Kwan | |
| 6,731,734 B1 | 5/2004 | Shaffer et al. | |
| 6,865,604 B2 * | 3/2005 | Nisani et al. | 709/224 |
| 7,054,933 B2 * | 5/2006 | Baxley et al. | 709/226 |
| 7,113,992 B1 * | 9/2006 | Even | 709/227 |
| 7,174,365 B1 * | 2/2007 | Even et al. | 709/204 |
| 7,593,987 B2 * | 9/2009 | Salesky et al. | 709/204 |

\* cited by examiner

SYSTEM AND METHOD FOR CONTROLLING ONE OR MORE MULTIPOINT CONTROL UNITS AS ONE MULTIPOINT CONTROL UNIT

CROSS REFERENCE TO RELATED APPLICATIONS

This application is a divisional of, and claims priority to, U.S. patent application Ser. No. 09/708,898, filed Nov. 8, 2000, which is hereby incorporated by reference, including any drawings, as if fully set forth herein.

FIELD OF THE INVENTION

This invention relates generally to multimedia communication, and more specifically, to a system and method for controlling multiple multimedia communication systems from a single control point.

BACKGROUND

As the geographical domain in which companies conduct business continues to expand, video teleconferencing technology attempts to bring the world closer together. However, to fully satisfy the requirement of having a face to face meeting, it is necessary for the video conferencing technology to provide real-time, multipoint conferencing that is a pleasure to utilize. However, in multipoint video conferencing, one main obstacle is the inefficiency of scheduling conferences.

In the current market, most multipoint video calls are scheduled in advance through companies that own Multipoint Control Units (MCUs). An MCU provides the capability for three or more terminals and gateways to participate in a multipoint conference. If a company owns more than one MCU, it has more flexibility in hosting video conferences. However, each MCU must be operated independently from the other MCUs in setting up and controlling video conferences. Additionally, the capacity of each MCU is limited to video conferences controlled by that MCU. The resources of the multiple MCUs cannot be combined to promote more efficient scheduling.

Each MCU is able to communicate with multiple conference participants. In an exemplary system, the MCU has ten participant slots, and thus can support ten users. The MCU may be configured so that more than one conference is going on at one time. For instance, a four participant conference and a five participant conference can be simultaneously supported on an MCU with a capacity of ten participants. Due to inefficient scheduling, many MCUs have extra capacity that cannot be used. In the example above, the MCU has capacity for ten participants but only nine participants are scheduled for conferences.

One reason why most multipoint video calls are scheduled in advance is that there is a low probability of successfully finding an open MCU quickly without prior scheduling. This probability is low largely because a conference scheduler must contact each MCU separately to attempt to initiate a video conference. If a large number of MCUs could be contacted simultaneously, the probability of finding an available MCU quickly and initiating an unscheduled video conference would be greatly increased. Additionally, if an MCU could share its excess capacity with another MCU, more conferences could be accommodated. The availability of this feature would facilitate escaping the bonds of scheduled video conferences and allowing impromptu video conferences to abound.

Therefore, it is evident that there is a need in the art for a system and method for operating multiple MCUs from a single control point. This will reduce the burden on any single MCU and allow greater ease in initiating a video conference.

Therefore, it is also evident that there is a need in the art for a system and method for operating multiple MCUs from a single control point to schedule conferences on multiple MCUs in such a way as to minimize the number of unused participant slots on each MCU.

Therefore, it is also evident that there is a need in the art for a system and method for operating multiple MCUs from a single control point in a manner that will allow video conference initiation without the need for prior scheduling.

SUMMARY

The present invention overcomes the above-described problems in the prior art by providing a single, apparatus that is capable of controlling a plurality of multipoint control units. This promotes efficient use of all of the MCUs because they are controlled and scheduled from a single point. Additionally, by combining the MCUs and controlling them from a single point, the probability of successfully scheduling an impromptu video conference is greatly increased.

The MCUs are interconnected to a common controlling Virtual MCU (VMCU). This VMCU controls all of the connected MCUs and is used to schedule and coordinate video conferences on all of these MCUs. The VMCU can be a separate unit or one of the MCUs.

In an exemplary embodiment of the present invention, the VMCU is able to identify reservation factors for each conference to be scheduled. The reservation factors may include, but are not limited to, start time, duration of the conference, number of participants, protocol type, bit rate, and terminal type.

In an exemplary embodiment of the present invention, the VMCU is able to identify capability factors for each of the multimedia terminals and each of the corresponding MCUs. The capability factors for the multimedia terminals include, but are not limited to, the type of terminal, the supported Codecs, and the speed of the terminal. The capability factors for the corresponding MCUs include, but are not limited to, the number of participants that can be included in conferences, the terminal types that can be supported and the speed of the MCU, the number of free audio bridges, the number of free Codecs, and the number of free video mixers. The number of free audio bridges and free video mixers refer to remaining capacity that each MCU has with respect to audio and video capabilities. Each MCU can either initiate or receive a call. The MCUs are responsive to a command from a multimedia terminal to initiate a multimedia communication between at least two of the multimedia terminals.

The VMCU can compare the capability factors for each of the multimedia terminals to the capability factors of the corresponding MCUs connected to the VMCU to determine an optimum assignment of resources for a video conference. The VMCU will be alerted when the time to start the conference has arrived. Upon being alerted that the time to start the conference has arrived, the VMCU rechecks the resources of the MCUs, compares them to the needs of the conference. The VMCU may change the assigned MCU at the last minute before the conference starts. The VMCU may either direct communication between the terminals and the MCU throughout a conference, or it can transfer the terminal to the MCU and allow the terminal and the MCU to communicate without interaction through the VMCU.

Other objects, features, and advantages of the present invention will become apparent upon reading the following detailed description of the embodiments of the invention, when taken in conjunction with the accompanying drawings and appended claims.

DETAILED DESCRIPTION

Figure 1:
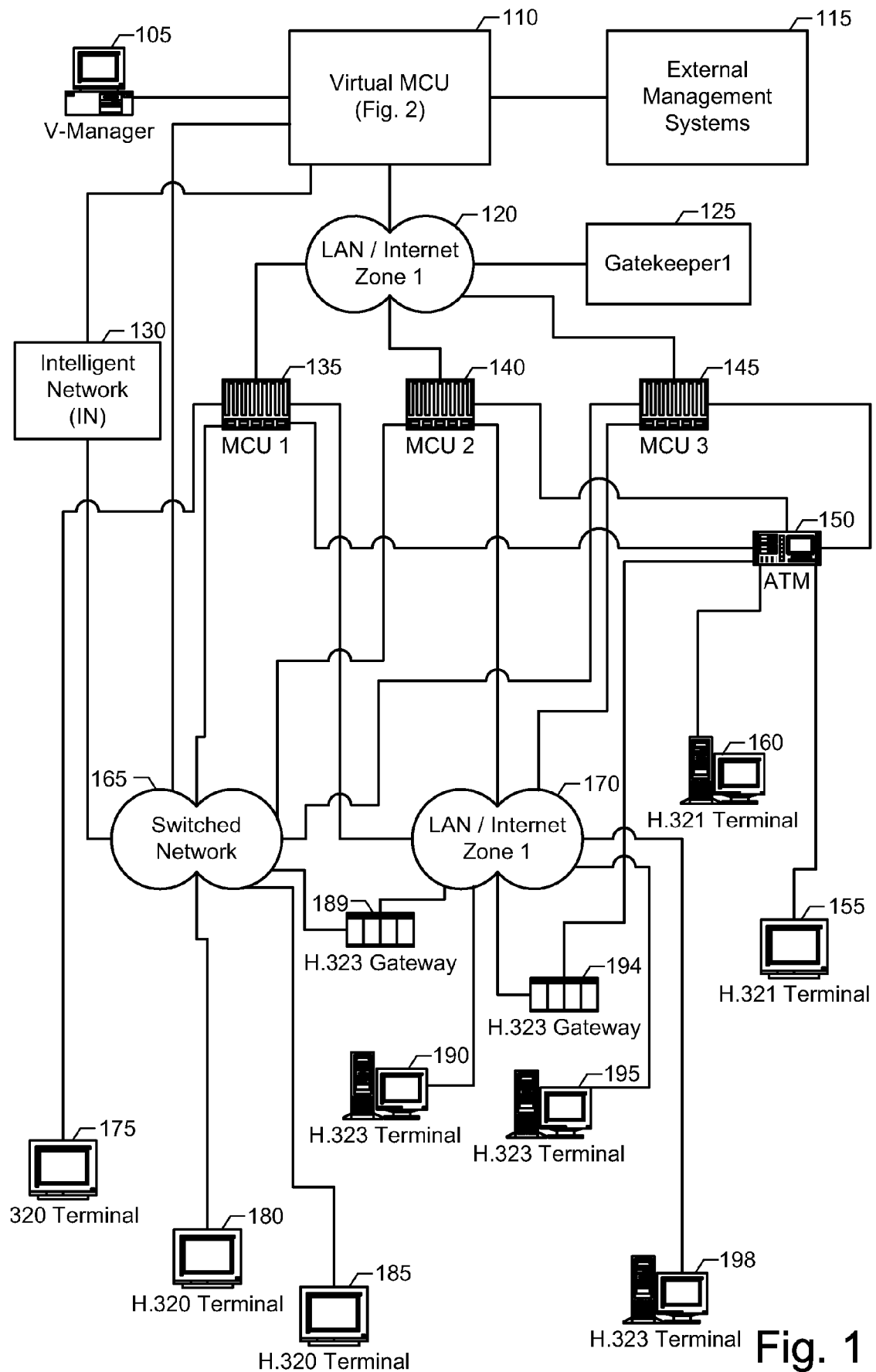
FIG. 1 is a system diagram that illustrates an exemplary environment suitable for implementing various embodiments of the present invention.

Referring now to the drawings, in which like numerals refer to like parts throughout the several views, exemplary embodiments of the present invention are described.

FIG. 1 is a system diagram that illustrates an exemplary environment suitable for implementing various embodiments of the present invention. The system is controlled by a Virtual MCU (VMCU) (110) and may include one or more MCUs (135, 140, 145). Although three MCUs are illustrated, the present invention is not limited to a particular number of MCUs and the presented configuration is intended to be illustrative of an exemplary configuration. In an exemplary embodiment of the present invention, the VMCU (110) is implemented with an internal router unit, which is a part of the conference manager (250), for routing the conference participants to an MCU (135, 140, 145). In alternative embodiments of the present invention, the VMCU (110) may be implemented with an MCU or any hardware or software component capable of implementing the VMCU (110) functionality. An operator may control the VMCU (110) through a V-Manager (105). The V-Manager (105) may be any user operated computing device, such as a PC, Macintosh, mainframe computer, hand held devices such as a PALM® or Windows CE device, UNIX machine, or other similar device. In an exemplary embodiment, the VMCU (110) is coupled to each of the MCUs (135, 140, 145) through a TCP/IP connection. However, other communication connections may be used in alternative embodiments. The connection between the VMCU and the various MCUs may be an Intranet or Internet connection. The MCUs (135, 140, 145) may be co-located or geographically dispersed. In an exemplary system, each MCU (135, 140, 145) supports connections with various types of terminals including, but not limited to H.321 (155, 160), H.323 (190, 195, 198) and H.320 (175, 180, 185) terminals. The connections to the terminals are illustrated as network clouds (165, 170). Those skilled in the art will appreciate that other terminal protocols could be used in alternative embodiments.

H.323 is a packet-based multimedia communications protocol. More information about communication protocols can be found at the International Telecommunication Union (ITU) web site: http://www.itu.int. An H.323 terminal provides for real-time, two-way communications with another H.323 terminal (190, 195, 198), or an MCU (135, 140, 145). H.323 terminals support the communication of control, status, audio, moving color video pictures, and/or data. Depending on the scenario, an H.323 terminal (190, 195, 198) may provide speech only, speech and data, speech and video, or speech, data and video.

H.320 is a communication protocol that uses narrow-band visual telephone systems and terminal equipment. An H.321 terminal (155, 160) is an adaptation of an H.320 visual telephone terminals to a B-ISDN environment. The VMCU (110) can support various types of connectivity. FIG. 1 illustrates connecting through a switched network (165), an Intelligent Network (IN) (130), an Asynchronous Transfer Mode (ATM) network (150) and/or a LAN/Internet (120, 170) networks 120 and 170 can be the same network. Network 120/170 may be connected via a gateway (189) to a switched network (165) and may be connected via a gateway (194) to an ATM network (150). Those skilled in the art will appreciate that the VMCU (110) may be connected to an MCU (135, 140, 145) through the aforementioned methods or any other connection that supports the transmission requirements of the MCUs.

A circuit switched network or switched network is a network in which a physical path is obtained for and dedicated to a single connection between two endpoints in the network for the duration of the connection. Endpoints include all network elements that can generate or terminate information streams. In an exemplary embodiment of the present invention, endpoints include, but are not limited to, telephones, terminals, gateways, MCUs, and VMCUs. Ordinary telephone service is circuit-switched.

An IN (130) is a telephone network architecture originated by Bell Communications Research in which the service logic for a call is located separately from the switching facilities, allowing services to be added or changed without having to redesign switching equipment.

In an exemplary embodiment of the present invention, the VMCU (110) system supports a TCP connection to the MCUs (135, 140, 145). It may include an Integrated Services Digital Network (ISDN) Primary Rate Interface (PRI) module and another LAN (120, 170) connection to the IN (130).

In an exemplary embodiment of the present invention, the VMCU (110) communicates over a LAN/Internet (120, 170), through a gatekeeper (125). The gatekeeper (125) is an H.323 entity on the network that provides address translation and controls access to the network for H.323 terminals (190, 195, 198), H.323 Gateways (189, 194) and MCUs (135, 140, 145). The Gatekeeper (125) may also provide other services to the terminals, Gateways, and MCUs such as bandwidth management and address resolution for Gateways.

An H.323 Gateway (189, 194) provides for real-time, two-way communications between H.323 Terminals (190, 195, 198) on the packet-based network, other Terminals on a switched circuit network (165), or to another H.323 Gateway (189, 194). Other Terminals include those complying with ITU recommendations, such as H.310 (H.320 on B-ISDN), H.320 (ISDN), H.321 (ATM), H.322 (GQOS-LAN), H.324 (GSTN), H.324M (Mobile), and V.70 (DSVD).

The VMCU (110) may either control all of the VMCU (110) functions described herein, or it may use an external management system (115) to control various functions of the VMCU (110). In an exemplary embodiment of the present invention, an external management system (115) may be used to operate the reservation system associated with the VMCU (110).

Figure 2:
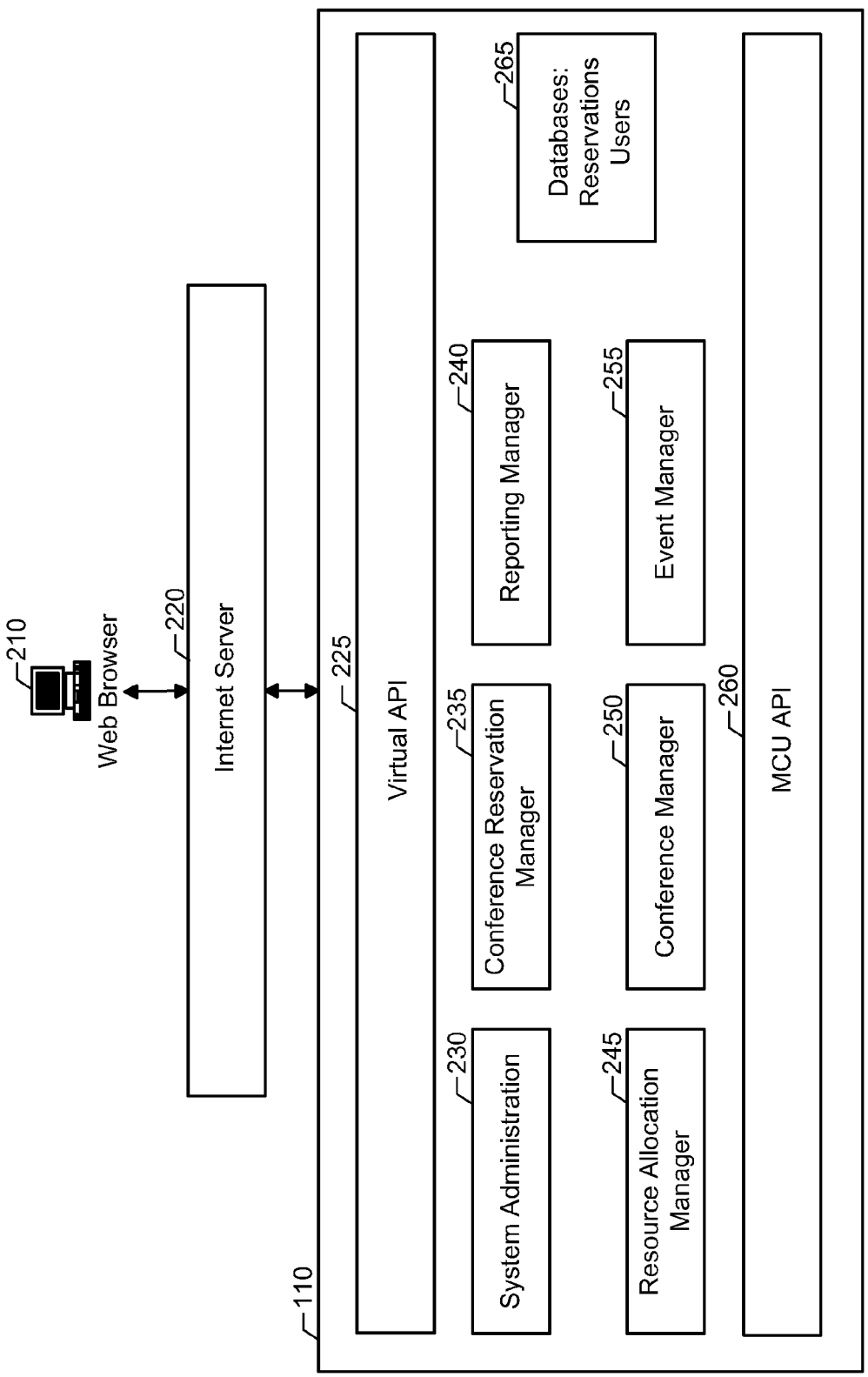
FIG. 2 is a block diagram of the VMCU.

FIG. 2 is a block diagram of the VMCU (110). The VMCU (110) is a platform independent system solution for controlling one or more MCUs (135, 140, 145). The VMCU may be one of the MCUs (135, 140, 145). In an exemplary embodiment of the present invention, the VMCU (110) includes several modules that use a shared database (265). The modules include, but are not limited to, the conference reservation manager (235), the conference manager (250), the resource allocation manager (245), the event manager (255), the reports manager (240), the system administrator tool (230), and the VMCU databases (265).

The Conference Reservation Manager (235) accepts requests for visual session reservations and uses the reservation parameters to verify that it can be accepted. The Conference Reservation Manager (235) then stores the reservation record in the database (265). If the session has to start immediately, the Conference Reservation Manager (235) passes the information to the Conference Manager (250).

The Conference Manager (250) starts a session when the session's time to start arrives. The Conference Manager (250) loads the session onto the target MCU via the MCU API (260) and gets status information from all of the MCUs concerning ongoing sessions. The Conference Manager (250) can accept requests for dial-in conferences and route the requests to the correct MCU or accept Intelligent Network (IN) requests for routing information. The Conference Manager (250) may route H.323 calls by forwarding H.225 and H.245 messages to the selected MCU or gatekeeper or by serving as a termination point for a call.

The Resource Allocation Manager (245) keeps the information concerning the MCUs' resources, i.e. audio bridges, video mixers, etc., and allocates the resources to conferences. The Resource Allocation Manager (245) also calculates resource availability for future reservations.

The Event Manager (255) receives messages, such as call start, call terminate, etc, for the different MCUs and stores the messages in a database (265).

The Reporting Manager (240) builds reports. The reports may include, but are not limited to, length of time resources were used, which resources were used for a specific session, and percentage of resources used during a specified time period. The reports are built upon the receipt of a report request from the Internet server (220).

The System Administrator (230) serves as an input tool for VMCU parameters. The VMCU parameter may include, but are not limited to, the number of MCUs controlled by the VMCU, the MCU addresses, and the MCUs' resources.

In an exemplary embodiment of the present invention, the VMCU databases (265) include databases for reservations, users, and any other data required for the operation of the VMCU (110). Database (265) can be an external Database including, but not limited to, a Database using LDAP or ILS. A virtual API (225) enables clients to do one or more of the following tasks: reserve conferences, start an impromptu conference, control on going conferences, and receive usage information. The aforementioned tasks may be completed from a standard web browser (210). The browser (210) interacts with an Internet server (220) that uses the virtual API (225).

In an exemplary embodiment of the present invention, the VMCU (110) offers users a web based tool enabling a user leading a conference to connect to the VMCU (110) and monitor and control the conference remotely. The VMCU (110) works as a proxy for the user by getting the information and sending controls to the actual MCU (135, 140, 145) supporting the conference. The end user does not have to know which MCU (135, 140, 145) is supporting the conference.

In an exemplary embodiment of the present invention, a VMCU (110) communicates with MCUs (135, 140, 145) through an MCU application program interface (MCU API) (260).

An exemplary embodiment of the present invention can operate within a four-phased video conference system. The four phases include: Configuration, Conference reservation, Conference scheduling, and Conference Control.

During the configuration phase, an operator enters configuration information for the MCUs (135, 140, 145) into the VMCU (110). Completing the configuration enables the VMCU (110) to verify and allocate resources for the conference during the reservation and scheduling phases.

The Conference reservation, Conference scheduling, and Conference Control phases will be discussed in conjunction with the following figures.

Figure 3:
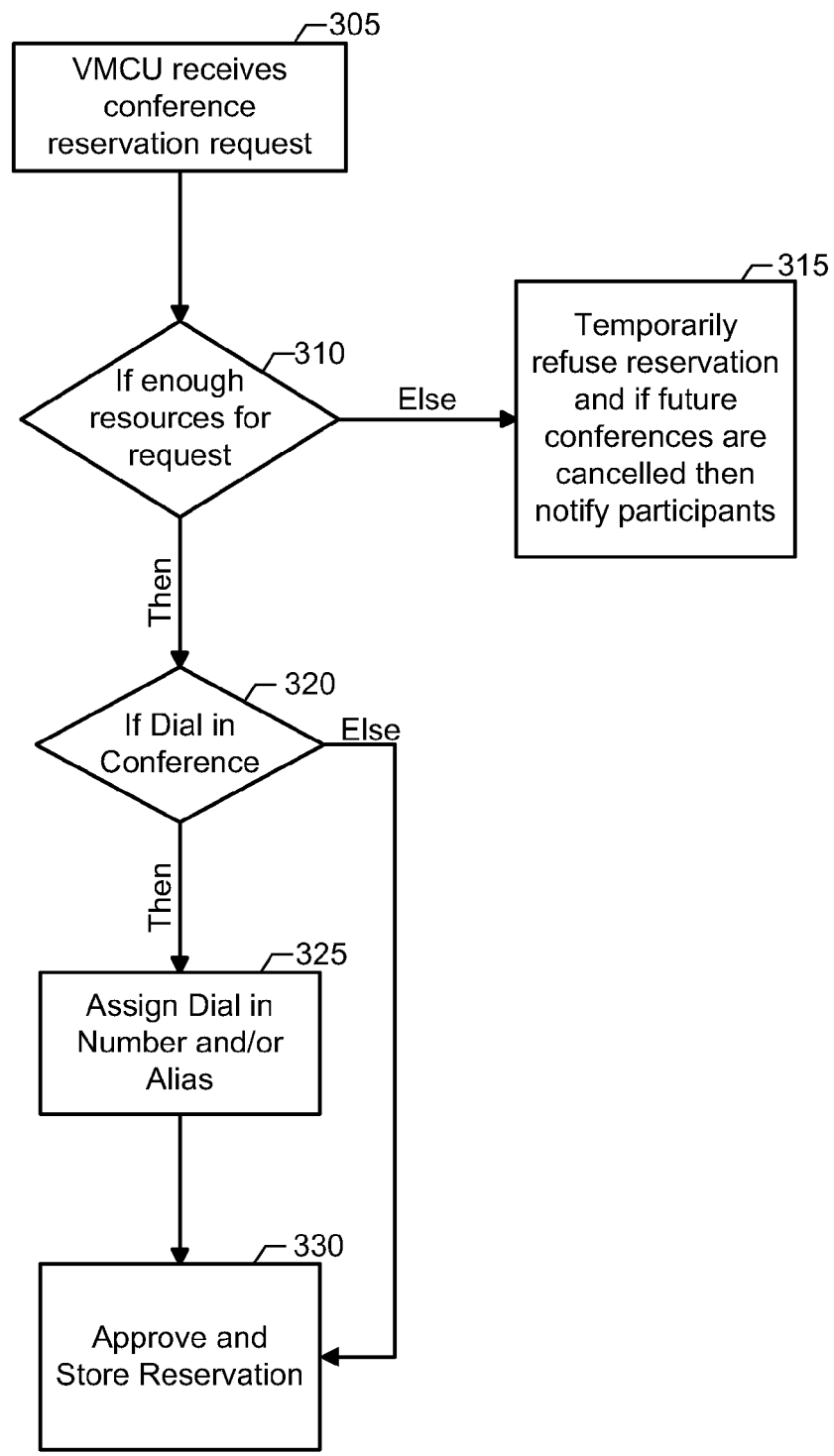
FIG. 3 is a flow diagram illustrating the steps involved in an exemplary embodiment of the present invention during the conference reservation phase.

FIG. 3 is a flow diagram illustrating the steps involved in an exemplary embodiment of the present invention during the conference reservation phase. The conference reservation phase is entered when a user wishes to reserve a conference. In an exemplary embodiment of the present invention, the conference may include H.320, H.323, and H.321 terminals. Initially, the VMCU (110) receives a conference reservation request (305). The conference reservation request includes information to allow the VMCU (110) to determine whether the resources necessary to support the requested conference are available (310). The resources necessary for the conference include the availability of MCU support for each conference participant. Each MCU supporting the conference must be able to communicate with the terminal to be supported by that MCU during the video conference. If there are insufficient resources available to support the requested conference, the reservation is temporarily suspended. If additional resources are obtained subsequent to the temporary suspension (i.e. another conference is canceled), then the VMCU (110) may notify the participants that the conference can now be scheduled (315).

In an exemplary embodiment of the present invention, the VMCU (110) is able to identify reservation factors for each conference to be scheduled. The reservation factors may include, but are not limited to, start time, duration of the conference, number of participants, protocol type, bit rate, and terminal type.

In an exemplary embodiment of the present invention, the VMCU (110) is able to identify capability factors for each of the multimedia terminals (155, 160, 175, 180, 185, 190, 195, 198) and each of the corresponding MCUs (135, 140, 145). The capability factors for the multimedia terminals (155, 160, 175, 180, 185, 190, 195, 198) include the type of terminal, codec type, and the speed of the terminal. The capability factors for the corresponding MCUs (135, 140, 145) include the number of participants that can be included in conferences, the terminal types that can be supported and the speed of the MCU (135, 140, 145), the number of free audio bridges, and the number of free video mixers. The number of free audio bridges and free video mixers refer to remaining capacity that each MCU (135, 140, 145) has with respect to audio and video capabilities. Each MCU (135, 140, 145) can either initiate or receive a call. The MCUs (135, 140, 145) are responsive to a command from a multimedia terminal to initiate a multimedia communication between at least two of the multimedia terminals (155, 160, 175, 180, 185, 190, 195, 198).

If the Conference Reservation Manager (235) of the VMCU (110) determines that there are enough resources available to host the conference (310), processing then continues at step 320. At step 320, the VMCU (110) determines how the participants will connect to the conference when it is time to start the conference. There are several conference connection options including: dial-in, dial-out, and network connection. In the dial-in connection option, the participants dial an assigned number associated with the MCU (135, 140, 145) assigned to host the conference and/or a conference Alias. In the dial-out connection option, the MCU (135, 140, 145) assigned to host the conference dials each of the participants. In the network connection option, both the participants and the MCU (135, 140, 145) are connected to a network and they communicate through that network. The network can be any type of network including LAN, Internet, Intranet, or other networks. The conference can also be initiated by all parties contacting the VMCU (110) and the VMCU (110) will handle communications.

At step 320, if the conference is a dial-out conference, the VMCU (110) records the telephone number of the participant so that the assigned MCU (135, 140, 145) can initiate a call to the participant at the scheduled start time for the conference. Alternatively, the VMCU (110) can initiate a call to each participant and control the communication between the assigned MCU (135, 140, 145) and the participants. If the conference is a dial-in conference type (320), the VMCU (110) assigns a dial-in number to the participant (325) and notifies the participant of the assigned number. This dial-in number is usually the dial-in number for the MCU (135, 140, 145) reserved for the conference. Alternatively, the VMCU (110) may assign a number to dial-in to the VMCU (110), or a different MCU (135, 140, 145), and then forward the call to the correct MCU (135, 140, 145) when the conference starts. H.320 terminals (175, 180, 185) will use this number to dial into the assigned MCU (135, 140, 145). Additionally, the conference may be scheduled over an Integrated Services Digital Network (ISDN) line or over a computer network. In these cases, the participants will connect to the conference over the ISDN lines. The ISDN number will point to one of the preferred MCU's (135, 140, 145) for the conference. It may optionally be a special number in cases where the system supports IN (130) connectivity. The number will be used as an E.164 alias by the H.323 terminals (190, 195, 198) to call through a gatekeeper (125). The ISDN number will be translated to the correct ATM (150) number during call setup in an H.321 terminal (155, 160).

After the VMCU (110) has determined that there are sufficient resources available to host the conference and the reservation has been approved, the VMCU (110) stores the reservation date, reservation time, participant names, dial-in numbers, the MCU(s) (135, 140, 145) assigned, and any other applicable information into a reservation database (330) (265). This reservation database (265) is available to the VMCU (110) to set-up the conference when the start time arrives. The reservation database may also be accessed if the VMCU (110) needs to change the information, such as assigning a different MCU (135, 140, 145) in order to create a more efficient schedule. Such a modification to the reservation database may be necessary when multiple conferences can be combined on MCUs (135, 140, 145) to minimize the number of unused participant slots during a conference. For instance, if a six participant conference is scheduled on an MCU (135, 140, 145) with ten participant slots and a four participant conference is scheduled on a different MCU (135, 140, 145), then these two conferences can be moved to a single MCU (135, 140, 145) with ten participant slots and all of the participant slots will be used. Thus this aspect of the present invention optimizes the efficiency in the use and scheduling of conference resources.

Additionally, the VMCU (110) may be configured to allow a single conference to be initiated across multiple MCUs (135, 140, 145). When the VMCU (110) operates in this manner, not all participants will be connected to the same MCU (135, 140, 145), but they will all be able to communicate with each other as the various MCUs (135, 140, 145) are cascaded by the VMCU (110). This aspect of the present invention allows a greater number of participant slots on each MCU (135, 140, 145) to be scheduled. This aspect further allows for the support of large conferences that include more participants than a single MCU (135, 140, 145) can accommodate. More particularly, this aspect of the present invention allows the VMCU (110) to operate as a single MCU (135, 140, 145) that is as large as the sum of all of the available participant slots on all of the connected MCUs (135, 140, 145). Typically, this aspect of the present invention is only used after conferences have been efficiently combined on the available MCUs (135, 140, 145) and the remaining capacity of the MCUs (135, 140, 145) is insufficient to support an additional conference.

When the VMCU (110) receives multiple conference requests, the VMCU (110) determines how to assign the conferences to the available MCUs (135, 140, 145). For instance, the VMCU (110) receives three conference requests for conferences requiring resources for conferences of sizes A, B, and C, where A, B, and C represent the number of participant slots needed by each conference. If two MCUs are available and the two MCUs have X participant slots, and if A plus B is greater than X, and B plus C is less than or equal to X, then the VMCU (110) assigns the conference of size A to a first MCU and the conferences of sizes B and C to a second MCU. If two MCUs are available and the two MCUs have X participant slots, and if A plus B is greater than X, A plus C is greater than X, and B plus C is greater than X, then the VMCU (110) assigns the conference of size A to a first MCU, the conferences of size B to a second MCU and assigns the conference of size C to a VMCU (110), wherein the VMCU (110) controls the remaining participant slots on the first and second MCUs as an additional MCU.

In an exemplary embodiment of the present invention, the VMCU (110) first optimizes the conference scheduling by combining conferences together onto a single MCU (135, 140, 145). After the MCUs (135, 140, 145) are scheduled as fully as possible, the VMCU (110) schedules the remaining MCU resources to conference participants as if the remaining resources comprised an additional MCU (135, 140, 145). These remaining resources are then cascaded by the VMCU (110).

Figure 4:
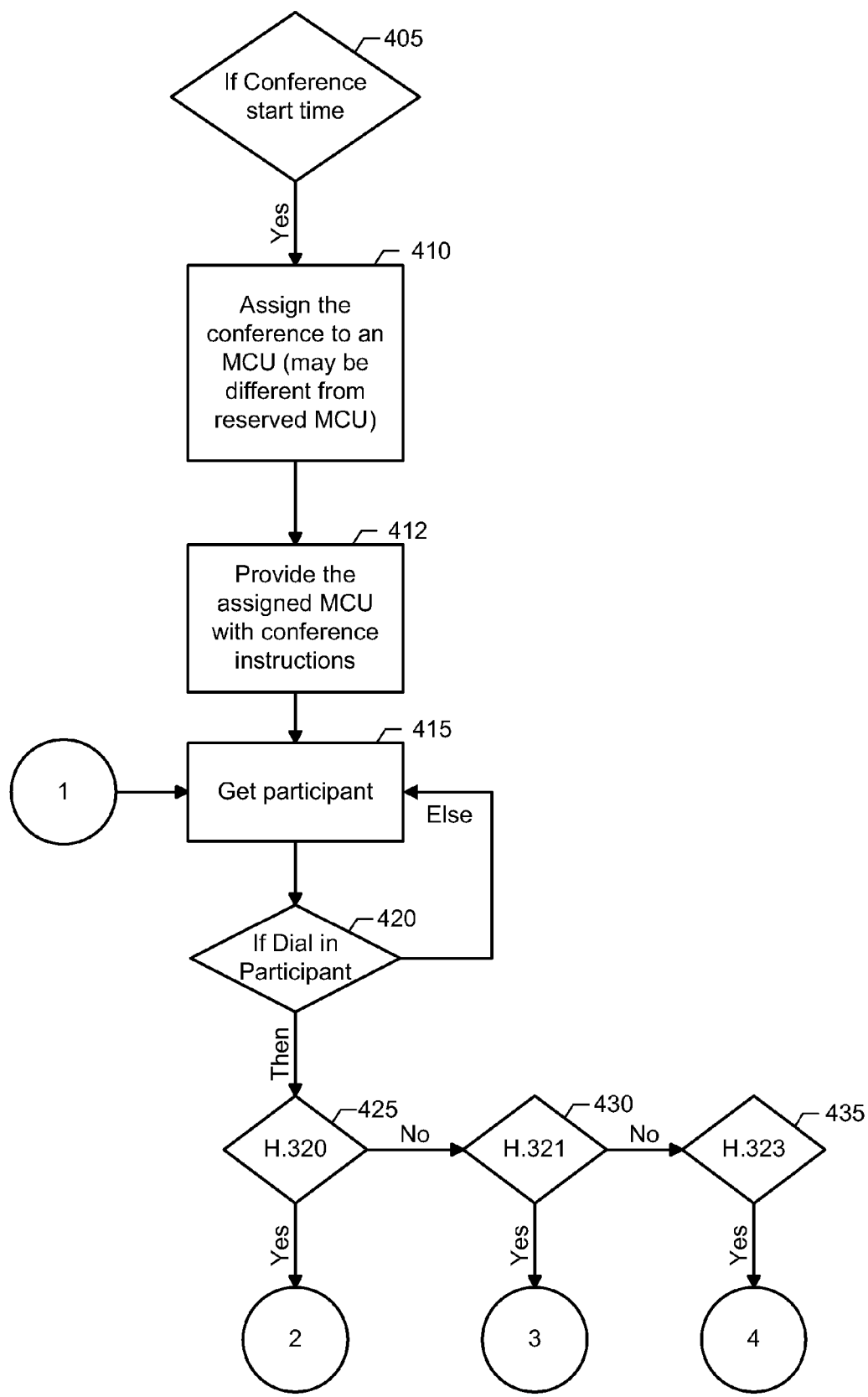
FIG. 4 is a flow diagram illustrating the steps involved in an exemplary embodiment of the present invention during the conference start phase.

FIG. 4 is a flow diagram illustrating the steps involved in an exemplary embodiment of the present invention during the conference start phase. Initially, the Conference Manager (250) of the VMCU (110) is alerted when the time to start the reserved conference has arrived (405). The VMCU (110) will next assign the conference to an MCU by selecting an MCU (135, 140, 145) that has sufficient resources to run the conference (410). The selected MCU may be the same MCU that was reserved for the conference or it can be a different MCU. After the VMCU (110) selects an MCU to run the conference, the VMCU (110) provides the MCU with the necessary instructions to run the conference (412). These instructions include information concerning how each participant will connect to the conference and any other information necessary for the MCU to run the conference.

If the conference is a dial-in conference, the VMCU (110) then either signals the MCU (135, 140, 145) corresponding to the dial-in number assigned to the conference to accept the conference, or the VMCU (110) provides the MCU (135, 140, 145) with a number to forward the call to if the VMCU (110) decides to run the conference on another MCU (135, 140, 145). If the conference is a dial-out conference, the VMCU (110) will notify the assigned MCU (135, 140, 145) which numbers it should dial to contact the desired participants. If the conference is a dial-in conference and the conference has been moved to a different MCU (135, 140, 145), the VMCU (110) may either direct the reserved MCU (135, 140, 145) to notify the participants of the new dial-in number, or if the MCU (135, 140, 145) is connected to an ISDN network that has a call forwarding service, the MCU (135, 140, 145) may be used to forward the call. If call forwarding is used, the VMCU (110) will send a call forward request to the local exchange serving calls to the MCU (135, 140, 145). Call forwarding on an ISDN line can be signaled during the call setup, or before the call, by providing a special code to the exchange. The special code identifies the number to which to forward the call. For H.323 conferences, the VMCU (110) will register the H.323 conference alias on the gatekeeper (125). For H.321 conferences, the VMCU (110) will register the H.321 ATM numbers with the ATM (150). In the case of an IN (130) based solution, the VMCU (110) will notify the IN (130) of the real destination number associated with the allocated dial-in number.

After the conference has been assigned to an MCU (410), the VMCU (110) will get the first participant for the conference (415). If the participant is not a dial-in participant (420), the VMCU (110) will provide the dial-out number to the assigned MCU to enable the assigned MCU to initiate a call to the participant. The dial-out number is available from the reservation database as recorded during the conference reservation phase. If the participant is a dial-in participant (420), the next action of the VMCU (110) will depend upon what type of terminal is being used. If the dial-in terminal is an H.320 terminal (425), processing continues at step 505 of FIG. 5. If the dial-in terminal is an H.321 terminal (430), processing continues at step 605 of FIG. 6. If the dial-in terminal is an H.323 terminal (435), processing continues at step 705 of FIG. 7.

In addition to the dial-in and dial-out options described above, the participant may connect to the conference by directly dialing the VMCU (110). If the participant dials the VMCU (110) directly, the call will either be forwarded to the assigned MCU (135, 140, 145) as described in FIG. 5, or the VMCU (110) will handle communications with the assigned MCU (135, 140, 145) through the network connecting the VMCU (110) to the assigned MCU (135, 140, 145). After the first participant is secured for the conference, the VMCU (110) will repeat the process for each additional participant.

Figure 5:
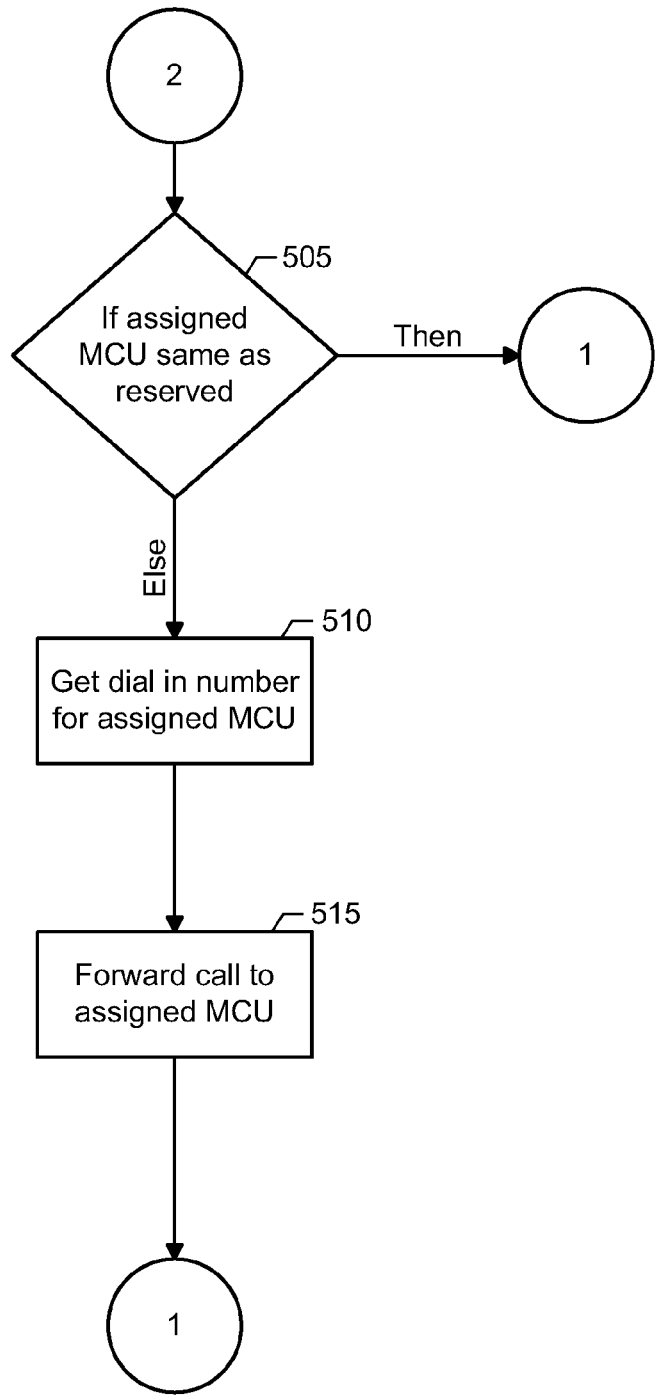
FIG. 5 is a flow diagram illustrating the steps involved in an exemplary embodiment of the present invention during the forwarding of a dial-in call from an H.320 terminal.

FIG. 5 is a flow diagram illustrating the steps involved in an exemplary embodiment of the present invention during the forwarding of a dial-in call from an H.320 terminal. After the VMCU (110) determines that the participant is a dial-in participant using an H.320 terminal (175, 180, 185), the VMCU (110) must determine how the terminal (175, 180, 185) will connect to the desired MCU (135, 140, 145). If the H.320 terminal (175, 180, 185) is currently assigned to the MCU (135, 140, 145) reserved for the conference (505), then that participant is ready to start the conference and the next participant can be processed. If the H.320 terminal is not assigned to the correct MCU (135, 140, 145) (505), then the VMCU (110) must get the dial-in number (510) for the correct MCU. Once the dial-in number is called, the VMCU (110) forwards the call to the correct MCU (135, 140, 145) (515). Additionally, the VMCU (110) may handle communications with the assigned MCU (135, 140, 145) through the network connecting the VMCU (110) to the assigned MCU (135, 140, 145).

Figure 6:
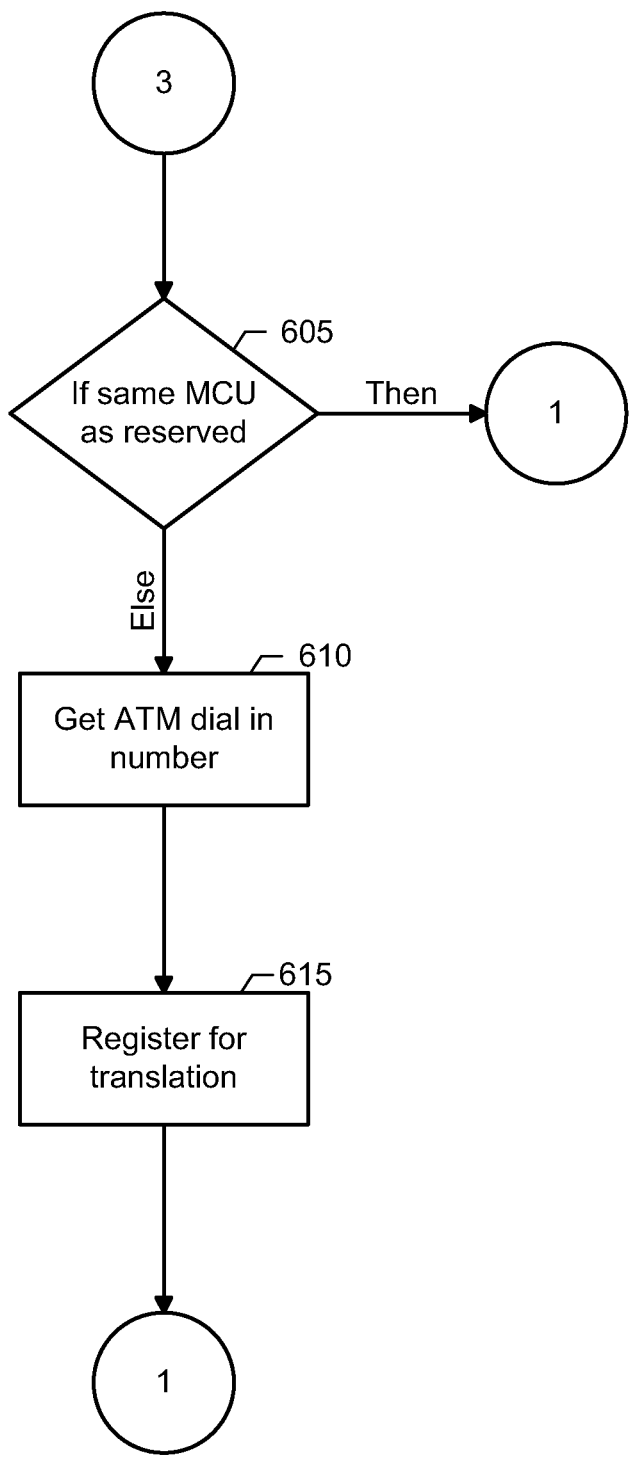
FIG. 6 is a flow diagram illustrating the steps involved in an exemplary embodiment of the present invention in response to a conference initiation from an H.321 terminal.

FIG. 6 is a flow diagram illustrating the steps involved in an exemplary embodiment of the present invention in response to a conference initiation from an H.321 terminal. After the VMCU (110) determines that the participant is a dial-in participant using an H.321 terminal (155, 160), the VMCU (110) must determine how the terminal (155, 160) will connect to the conference. If the H.321 terminal (155, 160) is currently assigned to the MCU (135, 140, 145) reserved for the conference (605), then that participant is ready to start the conference and the next participant can be processed. If the participant is not assigned to the correct MCU (135, 140, 145) (605), then the system must get the ATM dial-in number (610). If an ISDN number has been assigned to the conference by the VMCU (110), it will be translated to the correct ATM number during call setup in an H.321 terminal (155, 160) (615).

Figure 7:
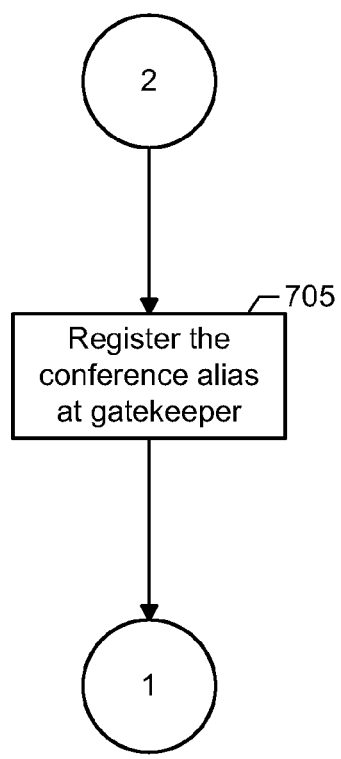
FIG. 7 is a flow diagram illustrating the steps involved in an exemplary embodiment of the present invention in response to a conference initiation from an H.323 terminal.

FIG. 7 is a flow diagram illustrating the steps involved in an exemplary embodiment of the present invention during a conference initiation process from an H.323 terminal. After the VMCU (110) determines that the participant is a dial-in participant using an H.323 terminal (190, 195, 198), the VMCU (110) will register the conference alias at the gatekeeper (705). Once the alias is registered at the gatekeeper, the H.323 terminal can communicate with the assigned MCU (135, 140, 145). The Alias assigned by the VMCU 110) during the conference scheduling phase will point to one of the preferred MCUs (135, 140, 145) for the conference. The number may optionally be a special number in cases where the system supports IN (130) connectivity. The number will be used as an E.164 alias by the H.323 terminals (190, 195, 198) to call through a gatekeeper.

The present invention provides the ability to schedule and initiate a conference, or other event, through a VMCU. The VMCU is designed to accept reservations and schedule conferences for a multitude of MCUs. This enables the VMCU to schedule the conferences in an efficient manner and to maximize the number of conferences scheduled at any particular time. The present invention has been described in relation to particular embodiments, which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

What is claimed is:

1. A controller for controlling two or more multipoint control units (MCUs), the MCUs operable to provide conferencing for a plurality of terminals, the controller comprising:
   an interface adapted for allocating resources of the two or more MCUs; and
   a database for storing conference reservations and capability factors for the two or more MCUs and the plurality of terminals;
   wherein each of the terminals can be served by each of the two or more MCUs, wherein the controller can initiate a conference by allocating resources of at least one of the MCUs for handling the conference, and wherein the controller logically combines capability factors of the two or more MCUs and treats the combination of capability factors as a single unit for allocating resources of the at least one of the MCUs for handling the conference, wherein the controller provides a first application program interface (API) for allowing a user to communicate with the controller; and wherein the controller provides a second API for allowing the controller to communicate with the two or more MCUs.

2. The controller of claim 1, wherein the conferencing is via a circuit switch network.

3. The controller of claim 1, wherein the conferencing complies with a communication protocol other H.323.

4. The controller of claim 1, wherein protocol is H.320 or H.321.

5. The controller of claim 1, wherein the interface is an application program interface (API).

6. The controller of claim 1, wherein allocating resources comprises:
combining resources of the plurality of MCUs to provide a combined MCU; and
allocating resources of the combined MCU for handling a conference.

7. The controller of claim 6, wherein allocating the resources of the combined MCU is on the basis of the capability factors of the MCUs and the plurality of terminals.

8. The controller of claim 7, wherein the capability factors of the plurality of terminals comprise one or more of terminal type, terminal speed, and codec type.

9. The controller of claim 7, wherein the capability factors of the MCUs comprise one or more of participant capacity, types of terminals supported, speed of the MCU, number of free audio bridges, and a number of free video mixers.

10. The controller of claim 6, wherein allocating the resources of the combined MCU results in resources of at least two MCUs being allocated to the same conference.

11. The controller of claim 6, wherein the combined MCU conducts at least two conferences simultaneously and wherein allocating resources of the combined MCU results in resources of a single MCU supporting at least two conferences.

12. A method of videoconferencing, comprising:
receiving a request using a first application programming interface to initiate a video conference between at least two multimedia terminals, wherein each of the terminals can be served by a plurality of MCUs;
comparing capability factors for each of the multimedia terminals with capability factors for each of the plurality of MCUs wherein the capability factors of the plurality of MCUs are combined and treated as a single unit for allocating resources of the at least one of the MCUs for handling the videoconference;
selecting, based on the comparing of capability factors, at least one MCU of the plurality of MCUs for handling the video conference; and
directing a communicative interconnection between the at least two multimedia terminals via the at least one selected MCU, using a second application programming interface for communicating with the plurality of MCUs.

13. The method of claim 12, wherein the interconnection between at least one of the terminals and at least one MCU is over a circuit switch network.

14. The method of claim 12, wherein the interconnection between at least one of the terminals and at least one MCU is via a communication protocol other than H.323.

15. The method of claim 14, wherein the protocol is H.320 or H.321.

16. The method of claim 12, wherein the capability factors of the at least two multimedia terminals comprise one or more of terminal type, terminal speed, and codec type.

17. The method of claim 12, wherein the capability factors of the MCUs comprise one or more of participant capacity, types of terminals supported, speed of the MCU, number of free audio bridges, and a number of free video mixers.

18. The method of claim 12, wherein selecting comprises maximizing a number of participants assigned to a single selected MCU.

19. The method of claim 12, wherein more than one MCU supports a single videoconference.

20. An apparatus for controlling ports of a plurality of MCUs, the apparatus comprising:
a database for storing capability factors for the ports;
a processor programmed to:
receive a request to start a videoconferencing session between at least two multimedia terminals, wherein the at least two multimedia terminals can be serviced by each one of the plurality of MCUs;
logically combine all of the ports of the plurality of MCUs and treat the combination of ports as a single unit for the purpose of selecting ports for handling the videoconferencing session;
compare the capability factors of the at least two multimedia terminals to the capability factors of each of the ports; and
responsive to the comparing, select ports from one or more of the MCUs for handling the videoconferencing session;
a first application program interface (API) for allowing a user to communicate with the apparatus; and
a second API for allowing the apparatus to communicate with a plurality of MCUs.

21. The apparatus of claim 20, wherein at least one of the multimedia terminals is connected over a circuit switch network.

22. The apparatus of claim 20, wherein at least one of the multimedia terminals complies with communication protocol other than H.323.

23. The apparatus of claim 22, wherein the protocol is H.320 or H.321.

24. The apparatus of claim 20, wherein the capability factors of the at least two multimedia terminals comprise one or more of terminal type, terminal speed, and codec type.

25. The apparatus of claim 20, wherein the capability factors of the ports comprise one or more of types of terminals supported, speed of the port, number of free audio bridges associated with the port, and a number of free video mixers associated with the port.

* * * * *